United States Patent
Yoshioka

(10) Patent No.: US 7,789,759 B2
(45) Date of Patent: Sep. 7, 2010

(54) GAME CONTENTS DELIVERY SYSTEM AND A METHOD OF DELIVERING GAME CONTENTS

(75) Inventor: Naoto Yoshioka, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 553 days.

(21) Appl. No.: 11/860,725

(22) Filed: Sep. 25, 2007

(65) Prior Publication Data

US 2008/0096668 A1 Apr. 24, 2008

(30) Foreign Application Priority Data

Oct. 23, 2006 (JP) .............................. 2006-287613

(51) Int. Cl.
*A63F 9/24* (2006.01)
*A63F 13/00* (2006.01)

(52) U.S. Cl. ........................................ 463/42; 463/43

(58) Field of Classification Search ................ 463/1–3, 463/40–43; 340/5.8, 10.6; 726/27, 28; 225/37, 225/30, 133; 713/193, 194; 705/40, 53, 705/26

See application file for complete search history.

(56) References Cited

U.S. PATENT DOCUMENTS

| | | | | |
|---|---|---|---|---|
| 6,119,229 | A * | 9/2000 | Martinez et al. | ............... 726/28 |
| 6,591,250 | B1 | 7/2003 | Johson et al. | |
| 6,607,444 | B2 * | 8/2003 | Takahashi et al. | ............. 463/42 |
| 6,821,205 | B2 * | 11/2004 | Takahashi et al. | ............. 463/42 |
| 6,899,628 | B2 * | 5/2005 | Leen et al. | ................... 463/42 |
| 7,674,166 | B2 * | 3/2010 | Takahashi et al. | .............. 463/3 |
| 2003/0100375 | A1 | 5/2003 | Wakae et al. | |
| 2003/0122858 | A1 | 7/2003 | Mauve | |
| 2004/0092313 | A1 | 5/2004 | Saito et al. | |
| 2007/0156539 | A1 * | 7/2007 | Yates | ........................... 705/26 |
| 2007/0197296 | A1 | 8/2007 | Lee | |

(Continued)

FOREIGN PATENT DOCUMENTS

JP 2002-078971 A 3/2002

(Continued)

OTHER PUBLICATIONS

English language Abstract of JP 2003-159481 A.

(Continued)

*Primary Examiner*—Dmitry Suhol
*Assistant Examiner*—Masud Ahmed
(74) *Attorney, Agent, or Firm*—Greenblum & Bernstein, P.L.C.

(57) ABSTRACT

A game contents delivery server receives a desire to obtain contents from the player terminal with presentation of the contents ID via a communication network. The game contents delivery server creates tag data uniquely defined when the desire to obtain the contents is received from the player terminal. The game contents delivery server delivers the contents to the player terminal by adding the tag data thus created to the contents identification information and transmitting the contents to the player terminal. An online video game control server creates delivered contents data in the case where the obtained contents information in which header data are added to the obtained tag data is received from the player character. The online video game control server then registers the created delivered contents data so that the contents indicated by the obtained contents information can be utilized.

6 Claims, 5 Drawing Sheets

| TAG DATA | HEADER DATA | | | ITEM DATA | | | | | | | | |
|---|---|---|---|---|---|---|---|---|---|---|---|---|
| TAG ID | MARKETPLACE ID | PLAYER ID | DL DATE AND HOUR | ITEM NAME | ITEM ID | EXPIRATION DATE | OFFENSIVE POWER | DEFENSIVE POWER | MAGIC POWER | RECOVERY POWER | IMAGE DATA | ...... |
| | | | | | | | | | | | | |
| | | | | | | | | | | | | |
| | | | | | | | | | | | | |
| | | | | | | | | | | | | |

ITEM IDENTIFICATION INFORMATION (PORTIONS PROVIDED BY MARKETPLACE PROVIDING SERVER)

ITEM BODY DATA

ITEM USAGE DATA (OBTAINED ITEM INFORMATION) (PORTIONS STORED IN PLAYER TERMINAL)

U.S. PATENT DOCUMENTS

2008/0214311 A1　9/2008　Saito et al.

FOREIGN PATENT DOCUMENTS

| JP | 2003-159481 A | 6/2003 |
|---|---|---|
| JP | 2004-097610 A | 4/2004 |
| WO | 98/47091 | 10/1998 |
| WO | 2006/022490 | 3/2006 |

OTHER PUBLICATIONS

English language Abstract of JP 2004-097610 A.
Microsoft Corporation, "Xbox Live Marketplace" [Online] URL: http://www.xbox.com/ja-JP/live/marketplace/, retrieved on Oct. 25, 2007.
English language Abstract of JP 2002-078971 A, Mar. 19, 2002.

* cited by examiner

FIG. 3

| TAG DATA | HEADER DATA | | | ITEM DATA | | | | | | |
|---|---|---|---|---|---|---|---|---|---|---|
| TAG ID | MARKETPLACE ID | PLAYER ID | DL DATE AND HOUR | ITEM NAME | ITEM ID | EXPIRATION DATE | OFFENSIVE POWER | DEFENSIVE POWER | MAGIC POWER | RECOVERY POWER | IMAGE DATA | ...... |
| | | | | | | | | | | | | |
| | | | | | | | | | | | | |
| | | | | | | | | | | | | |
| | | | | | | | | | | | | |

ITEM IDENTIFICATION INFORMATION (PORTIONS PROVIDED BY MARKETPLACE PROVIDING SERVER)

ITEM BODY DATA

ITEM USAGE DATA (OBTAINED ITEM INFORMATION) (PORTIONS STORED IN PLAYER TERMINAL)

FIG. 6

| GAME TITLE | ITEM NAME | | CHARGE/ CHARGE-FREE | DL |
|---|---|---|---|---|
| ITEM LIST SCREEN | | | | |
| GAME A | ITEM A | ---------- | CHARGE | ☐ |
| | ITEM B | ---------- | CHARGE | ☐ |
| | ITEM C | ---------- | CHARGE-FREE | ☐ |
| | ITEM D | ---------- | CHARGE-FREE | ☐ |
| GAME G | ITEM E | ---------- | CHARGE | ☐ |
| | ITEM F | ---------- | CHARGE | ☐ |
| | ITEM G | ---------- | CHARGE | ☐ |
| | ITEM H | ---------- | CHARGE-FREE | ☐ |
| | ITEM I | ---------- | CHARGE | ☑ |

GAME CONTENTS DELIVERY SYSTEM AND A METHOD OF DELIVERING GAME CONTENTS

CROSS-REFERENCE TO RELATED APPLICATION

The present disclosure relates to subject matter contained in Japanese Patent Application No. 2006-287613, filed on Oct. 23, 2006, the disclosure of which is expressly incorporated herein by reference in its entirety.

BACKGROUND OF THE INVENTION

1. Field of the Invention

The present invention relates to a technique for delivering contents utilized in a video game played on a player terminal, which a player operates, to the player terminal via a communication network.

2. Description of the Related Art

Heretofore, various so-called role playing games (RPG; that is, a game in which a player plays a role of a character in a world of the game, and accomplishes a predetermined object while enjoying a process that the character grows through various experiences) have been provided. Further, heretofore, various online games delivered to a player terminal via a communication network such as the Internet have been provided. There are some RPGs delivered online among the various RPGs.

There is a demand to utilize a wide variety of items in a game among players who enjoy various games such as a RPG. In order to meet with such a demand, new items usable in various games, such as a RPG, in online games are published on the website as needed. A service to provide the new items to the players with charge or without charge (charge-free) is offered.

Heretofore, an online video game has mostly been played using a household personal computer. Recently, along with the spread of the online video games, various household general-purpose game machines each having a function to connect itself to a communication network have come to market in which a battle is executed between users of the same game machine via the communication network, or game contents corresponding to one game machine can be downloaded from a special site for the one game machine. In general, the game contents used in the household general-purpose game machines cannot be reproduced (or played) in other game machines than the corresponding hardware (game machine). Thus, game machine manufacturers tend to expand services of one's company or to increase one's lineup of more game contents. The game machine manufacturer makes an ingenious plan in order that customers (users) of the game contents of the game machine manufacturer do not flow out (or escape) to other game machines and other game contents for the other game machines.

As part of the ingenious plan, the game machine manufacturer oneself creates a communication network environment relating to the online video games that correspond to its own game machine by forming a platformer oneself, and also creates a mechanism in which a player is matched with an opponent of an online video game or teammates to play together via the communication network, new game contents can be downloaded, or game contents and various items usable in the corresponding game contents are sold at a virtual shop (marketplace) in a portal site with charge (for example, see "Xbox Live Marketplace", Microsoft Corporation, URL: http://www.xbox.com/ja-JP/live/marketplace/).

In order to cause players to play the same video game for a long time, additional release of new items becomes very effective means to keep the players interested in the video game. However, in the case where the game contents provider itself manages the portal site of the game contents and provides (or delivers) such new items to the players, the players have to access the portal site of the game contents provider that provides the game contents in order to receive provision of the new items. For this reason, in the case where the player has already lost interest in the game contents and thereby has no opportunity to access the portal site, opportunity to spread new items is restricted even though the new items are additionally released, whereby it is impossible to achieve sufficient effects (for example, the effect that the player's interest in the game contents is improved again, or sufficient benefits obtained due to provision of the new items in the case of providing the new items with charge). In addition, access means to obtain the new items is restricted for the player.

Further, in the case where the game machine manufacturer forms a platformer to provide (or deliver) new items, the platformer provides marketplaces each having a function of a virtual shop on the communication network, and provides items usable in the corresponding online video game in addition to a portal site of the online video game that corresponds to the game machine treated by oneself. By providing such a portal site, in the case where information on the new items is posted on a top page of the portal site, the information on provision of the new items can be provided to the players who loses the interest in the game contents without his or her particular intention when the players access other game contents provided by the same platformer or searches information on new game contents. Thus, it is possible to increase opportunity to notify or spread information on the items compared with the case where game contents are provided using a special site for specific game contents.

However, even in the case of using the configuration as described above, a player who does not have great interest in the video game itself may not access the portal site when the player does not play the video game. Thus, it has not been enough to spread information on additional release of new items widely.

Here, since there are a wide variety of items to be utilized in each of video games, it is required that large quantities of data on the wide variety of items have to be shared and synchronize with game contents providers. For this reason, it is difficult to simply increase entities that provide or deliver items (that is, entities that carry out provision or delivery service for the items).

SUMMARY OF THE INVENTION

It is one object of the present invention to solve the problems described above and to provide a game contents delivery system and a method of delivering game contents capable of reducing the processing load to deliver items utilized in a video game and increasing entities that deliver items, and this makes it possible to improve convenience to deliver and obtain the items.

In order to achieve the above object, one aspect of the present invention is directed to a game contents delivery system. The game contents delivery system includes an online video game control server for controlling progress of a video game via a communication network, the video game being played in a player terminal, the player terminal being to be operated by a player The game contents delivery system also includes a game contents delivery server for delivering contents utilized in the video game to the player terminal via the communication network.

In this case, the game contents delivery server includes a contents identification information database for storing contents identification information including a contents ID therein.

The game contents delivery server also includes a contents obtaining desire receiver that receives a desire to obtain contents from the player terminal with presentation of the contents ID.

The game contents delivery server also includes a tag data creator that creates tag data when the contents obtaining desire receiver receives the desire to obtain the contents from the player terminal, the tag data being defined uniquely.

The game contents delivery server also includes a contents deliverer that delivers the contents to the player terminal by adding the tag data created by the tag data creator to the contents identification information and transmitting the contents to the player terminal.

Further, the online video game control server includes a contents data database for storing contents data therein, the contents data including the contents identification information and contents body data, the contents body data being capable of specifying details of the contents.

The online video game control server also includes a delivered contents data register that creates delivered contents data in the case where the obtained contents information in which header data are added to the obtained tag data is received from the player character, the delivered contents data including the obtained contents information and the contents body data of the contents data including the contents ID included in the obtained contents information, the delivered contents data register registering the created delivered contents data so that the contents indicated by the obtained contents information can be utilized.

Since the game contents delivery system may have the configuration described above, it is possible to reduce the processing load to deliver contents (for example, items) utilized in a video game and to increase entities that deliver contents, and this makes it possible to improve convenience to deliver and obtain the items.

It is preferable that the contents body data include variable items such as usable term after obtaining the contents and usable count for the contents. In this case, the game contents delivery system further includes a delivered contents data updater that updates the variable terms in the registered delivered contents data as needed when a request to utilize the contents in the video game is received.

It is preferable that the contents include at least one item of a character, a weapon, a protector, a fitting object and a medicine.

It is preferable that the header data include download date and time of the contents data.

Further, in another aspect of the present invention, the present invention is directed to a game contents delivery method of delivering contents to a player terminal via a communication network. In this case, the contents are utilized in a video game played in a player terminal, and the player terminal is to be operated by a player. The game contents delivery method of the present invention includes receiving a desire to obtain contents from the player terminal with presentation of a contents ID.

The game contents delivery method also includes creating tag data when the desire to obtain the contents is received from the player terminal, the tag data being defined uniquely.

The game contents delivery method also includes delivering the contents to the player terminal by adding the tag data created in the creating tag data to contents identification information and transmitting the contents to the player terminal.

The game contents delivery method also includes creating delivered contents data by referring to a contents data database for storing contents data in the case where the obtained contents information in which header data are added to the obtained tag data is received from the player character, the delivered contents data including the obtained contents information and contents body data of the contents data including the contents ID included in the obtained contents information, the contents data including the contents identification information and the contents body data, the contents body data being capable of specifying details of the contents.

The game contents delivery method also includes registering the created delivered contents data in an online video game control server so that the contents indicated by the obtained contents information can be utilized, the online video game control server controlling progress of the video game via the communication network.

According to the present invention, it is possible to reduce the processing load to deliver contents (for example, items) utilized in a video game and to increase entities that deliver contents, and this makes it possible to improve convenience to deliver and obtain the items.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of item data to which tag data and header data are added.

FIG. 6 is an explanatory drawing that shows an example of an item list screen.

DETAILED DESCRIPTION OF THE INVENTION

Preferred embodiments of a game contents delivery system and a method of delivering game contents according to the present invention will now be described in detail with reference to the appending drawings.

Figure 1:
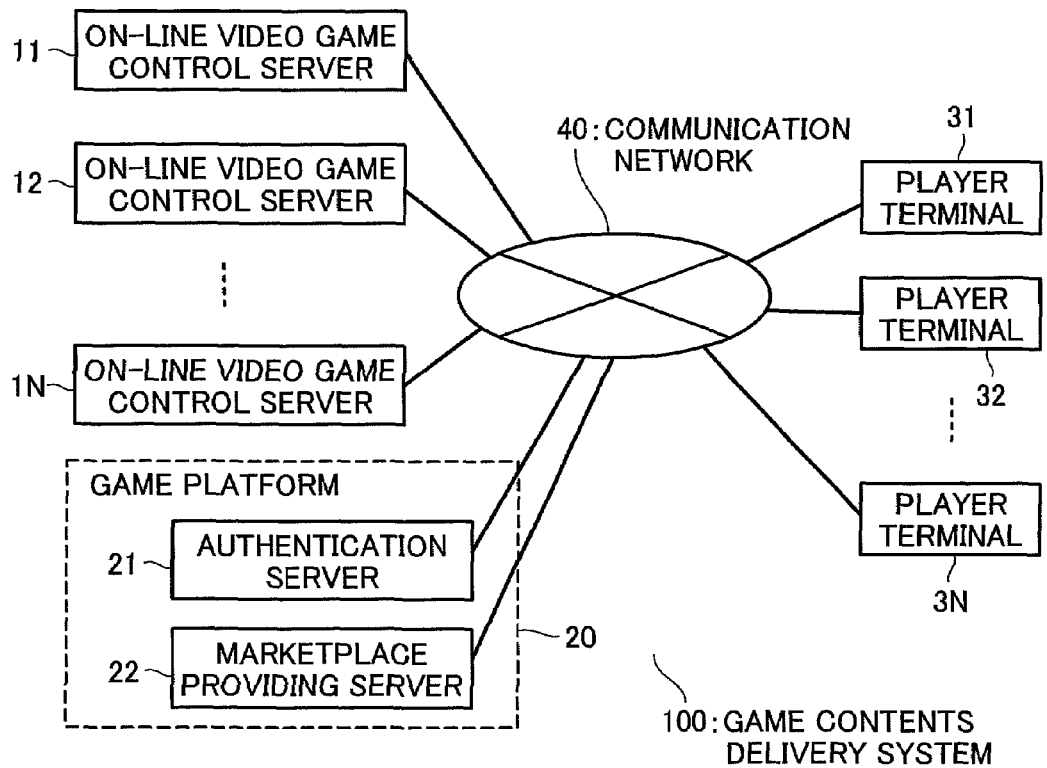
FIG. 1 is a block diagram that illustrates an example of a configuration of a game contents delivery system.

FIG. 1 is a block diagram that illustrates an example of a configuration of a game contents delivery system 100 according to one embodiment of the present invention. In this case, an online video game delivery system including one or more online video game control server is included in the game contents delivery system 100.

As shown in FIG. 1, the game contents delivery system 100 includes a plurality of online video game control servers 11 to 1N ("N" is an arbitrary positive integer), a game platform 20 and a plurality of player terminals 31 to 3N. In this regard, a plurality of game platforms may be provided in the game contents delivery system 100.

The game platform 20 is realized by an authentication server 21 and a marketplace providing server 22. The game platform 20 is managed by a game platform provider (more specifically, a manufacturer for a game machine in which an online video game of each of various game software publishers, for example, can be executed may be the game platform provider), for example. The game platform provider carries out provision of contents utilized in the video game and provision of a portal site for each of various online video games. In this case, various items such as new items and standard items utilized in various video games, music data utilized for sound effects in the various video games, image data utilized for background screens in the various video games and the like are included in (or correspond to) the contents utilized in the video game in addition to video game programs themselves. The new items may be items newly delivered to player terminals separately from a package of a video game after the video game is delivered (provided) to a player terminal of a user (or player). The standard items may be items included in the package of the video game when the video game is delivered to the player terminal of the player.

Each of the plurality of online video game control servers 11 to 1N, the authentication server 21, the marketplace server 22 and the plurality of player terminals 31 to 3N is connected to a communication network 40 such as the Internet.

The online video game control servers 11 to 1N are managed by various game providers each providing (and/or delivering) an online video game, respectively. Each of the online video game servers 11 to 1N has various functions for providing (or delivering) an online video game for each of the player terminals 31 to 3N. Each of the online video game control servers 11 to 1N is constituted from an information processing apparatus such as a WWW server.

Each of the online video game control servers 11 to 1N includes a database (DB) constructed from a database apparatus, for example. Control program for video games to deliver online video games and various kinds of data such as item data (will be described later) are stored in the DB.

In this regard, item data are created and registered for a video game to be delivered by a manager (or operator) of each of the online video game control servers 11 to 1N, for example. When the item data are registered, only item identification information (will be described later) in the item data is to be transmitted to and registered in the marketplace providing server 22. In this case, item body data (will be described later) in the item data is registered only in each of the online video game control servers 11 to 1N. For this reason, the manager (or operator) of the corresponding online video game control server 11 to 1N is allowed to update the item body data as needed.

The authentication server 21 has a function to execute various processes such as an authentication process for authenticating a user (or player) who accesses the game platform 20.

The marketplace providing server 22 is managed by an item deliverer (in the present embodiment, a game platform provider) that delivers items to any player. The marketplace providing server 22 has a function to manage an item providing site for introducing item information including new item information and to deliver (or provide) items to the player terminals 31 to 3N with charge or without charge (charge-free).

The player terminals 31 to 3N are respectively managed by players of the online video game(s). Each of the player terminals 31 to 3N is constituted from an information processing apparatus such as a commercial video game device, a household general-purpose personal computer and potable information terminal, for example. Each of the player terminals 31 to 3N includes hardware and software for connecting itself to the communication network 40. Each of the player terminals 31 to 3N also includes a display device inside or outside the player terminal itself. The display device has an image display screen constituted from a television apparatus or a liquid crystal display.

Figure 2:
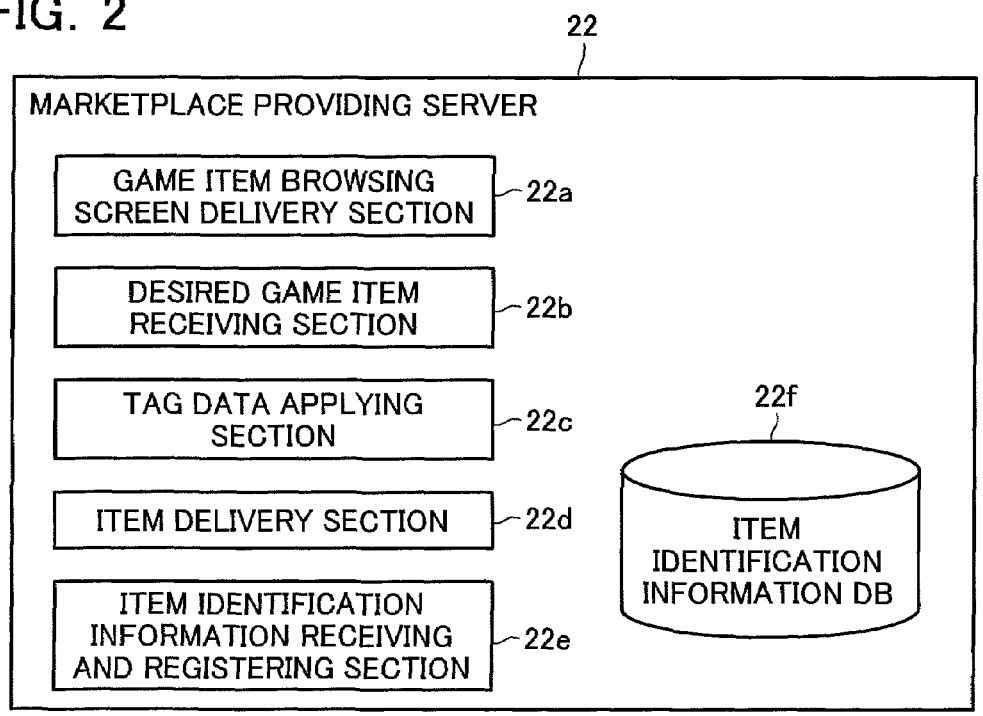
FIG. 2 is a block diagram that illustrates an example of a configuration of a marketplace delivery server.

FIG. 2 is a block diagram that illustrates an example of a configuration of the marketplace providing server 22. As shown in FIG. 2, the marketplace providing server 22 includes: a game item browsing screen delivery section 22a for delivering an item list screen (will be described later); a desired game item receiving section 22b for receiving a desired item that a player desires to obtain; a tag data applying section 22c for creating and applying tag data to an item; an item delivery section 22d for delivering an item; an item identification information receiving and registering section 22e for receiving and registering item identification information from an item creator; and an item identification information DB 22f.

The item identification information DB 22f is constructed from a database apparatus including a storage medium, for example. Portions corresponding to item identification information among various kinds of data on the item data for the respective items are stored in the item identification information DB 22f.

As shown in FIG. 3, the item data are constituted from various kinds of information for specifying an item. The various kinds of information include: an item name indicating a name of the item; an item ID uniquely applied to each item; an expiration date for the corresponding item; offensive power that the corresponding item has; defensive power that the corresponding item has; magic power that the corresponding item has; recovery power that the corresponding item has; image data for drawing the corresponding item; and the like. The item identification information is information for identifying the item, and is constituted from the item name and the item ID in the item data. Further, in the present embodiment, data other than the item identification information in the item data are to be called as "item body data". Thus, data indicating a property of the item, various functions fulfilled on the online video game, and an outline on the online video game screen are included in the item body data.

In FIG. 3, tag data created by the marketplace providing server 22 and header data created by each of the player terminals 31 to 3N are also shown. The tag data are a product tag uniquely defined for each of the delivered item data in order to be capable of uniquely specifying the delivered item data, and just an identification code having a given data length. Even in the case of the same item, different tag data is applied to the item depending on when and who download the item. For this reason, it is possible to identify all of the downloaded item data. Namely, the tag data plays a roll the same as a serial number in products for daily use.

As shown in FIG. 3, the tag data is constituted so as to include a marketplace ID in addition to the portion of the tag ID merely utilized as an identification code. By including the marketplace ID in the tag data, it is possible to prevent the situation in which tag data cannot be maintained uniquely because the tag IDs issued by different marketplaces correspond with each other accidentally. Even though the number of bites assigned to the tag ID is very small, the tag ID can be determined in enormous combinations. Thus, it seems that the case where the tag IDs correspond with each other accidentally happens extremely hardly. The more marketplaces exist, the higher a probability to correspond with each other becomes. By including the marketplace ID in the tag data, even in the environment where many marketplaces exist, it is possible to maintain the tag data uniquely. In this case, in the case where a game contents provider applies a marketplace ID to a player as proof that sale of the item is permitted, this leads to prevention of sale of the item without permission. In this case, tag data may be one that does not include a marketplace ID.

Further, the header data is a header capable of specifying a destination for supply of the delivered item data (more specifically, player (or player terminal) who obtained the item data) and supply date and time. The header data include at least download (DL) date and time of the item data. As shown in FIG. 3, a player ID for specifying the player (or the player terminal) who obtained the item data and the like may be included in the header data. In this regard, even in the case where the player ID is not included in the header data, the marketplace providing server 22 may be designed so that the player is identified at an authentication process when the player logins the corresponding game contents.

In this case, in the present embodiment, as shown in FIG. 3, the portions of the item usage data constituted from the tag data, the header data and the item identification information are stored in a memory medium such as a RAM with which each of the player terminals 31 to 3N, to which the corresponding item is delivered, is provided. Namely, the item usage data are data to be stored in the player terminals 31 to 3N in order to utilize the obtained item.

Next, an operation of the game contents delivery system 100 according to the present embodiment will now be described.

Figure 4:
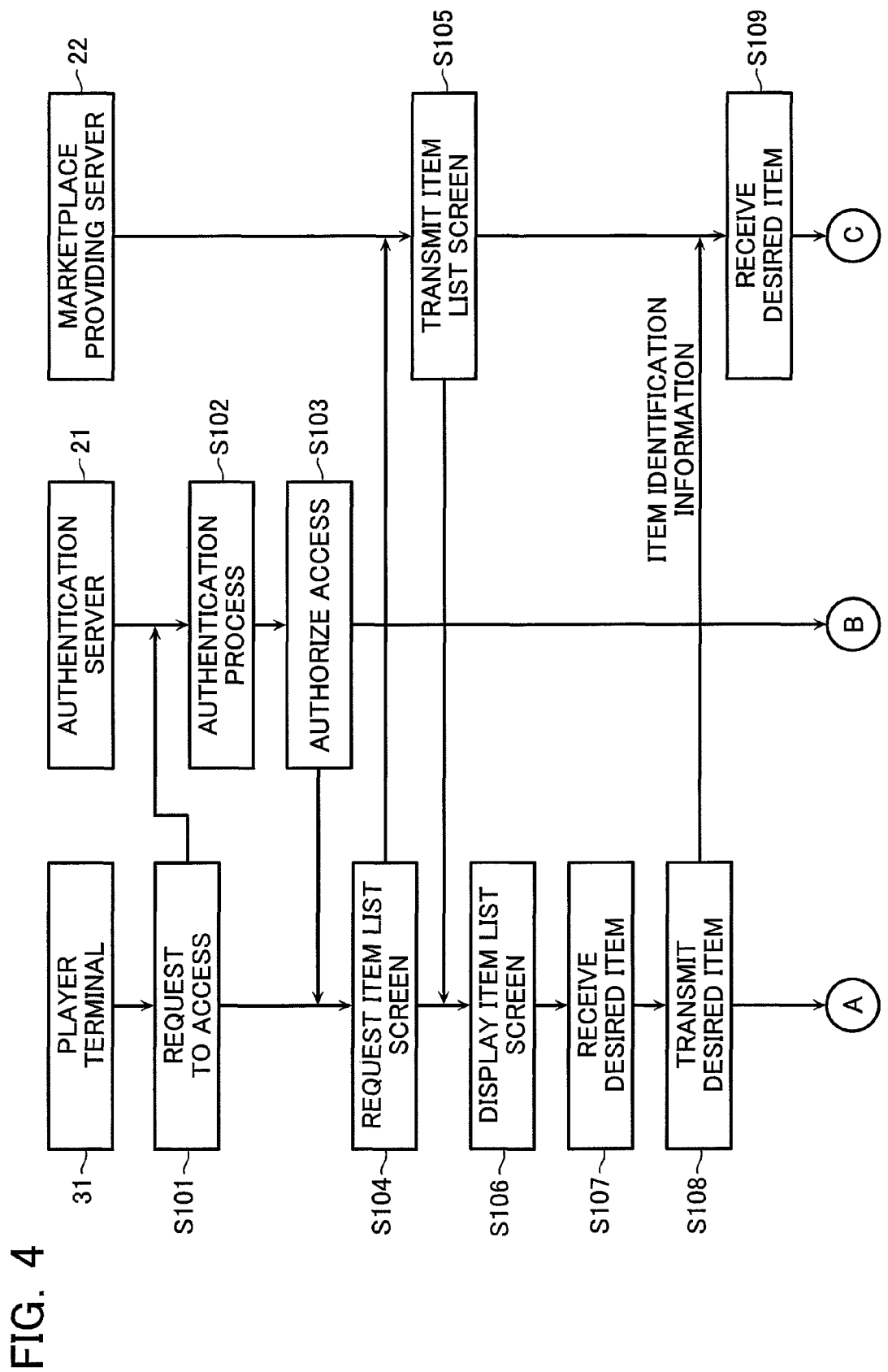
FIG. 4 is a flowchart that illustrates an example of a game contents delivery process.
Figure 5:
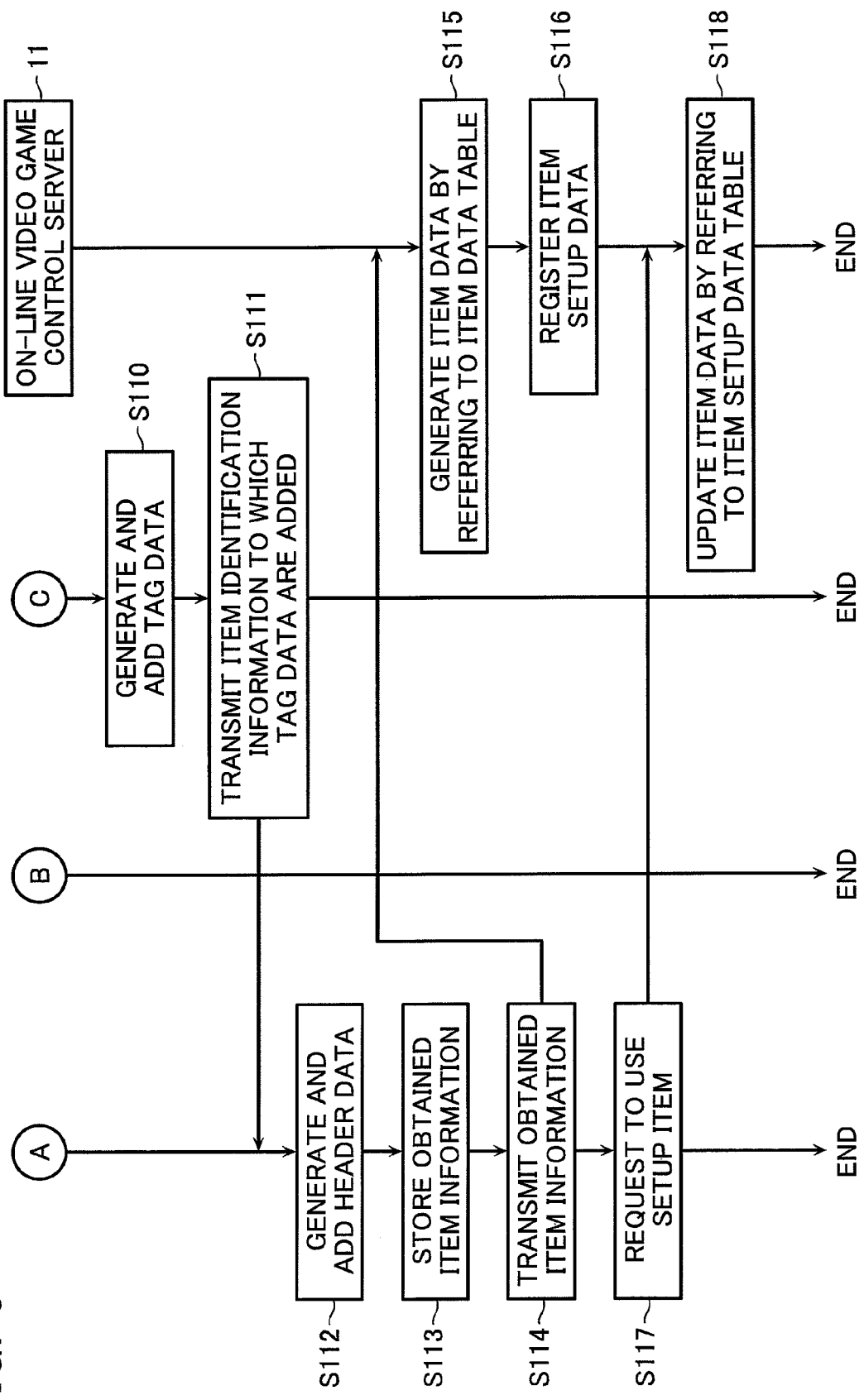
FIG. 5 is a flowchart that illustrates an example of a game contents delivery process.

FIGS. 4 and 5 are a series of flowchart that illustrates an example of a game contents delivery process in the game contents delivery system 100 according to the present embodiment. Here, in order to simplify the explanation of the game contents delivery process, processes in which a new item I utilized in an online video game G is delivered (or provided) to a player terminal 31 to makes it possible to utilize the delivered item I in the online video game G in response to a desire of a player P who plays (or attempts to play) the online video game G by operating the player terminal 31 of the player P will be explained. Further, explanation for any process other than the processes relating to the present invention, in particular, may be omitted.

In the game contents delivery process, the player terminal 31 requests to access to the marketplace providing server 22 (Step S101). When the authentication server 21 receives the request to access from the player terminal 31, the authentication server 21 executes an authentication process to determine whether the player P operating the player terminal 31 is a registered user or not (Step S102). The authentication process is executed by confirming a player ID and/or a password applied to the player P in advance, for example.

In the case where the player P is authenticated, the authentication server 21 informs the player terminal 31 operated by the player P of access permission (Step S103). When the notification of the access permission is received, the player terminal 31 requests the marketplace providing server 22 to deliver (or provide) an item list screen (Step S104).

When the request to deliver the item list screen is received, the game item browsing screen delivery section 22a of the marketplace providing server 22 transmits the item list screen to the player terminal 31 (Step S105). The player terminal 31 then displays the received item list screen on a display device with which the player terminal 31 is provided (Step S106).

For example, as shown in FIG. 6, the item list screen is a screen in which various new items respectively utilized in various online video games are displayed and the player P is caused to select an item desired to obtain. The item list screen includes a display region for displaying a title of a video game, a display region for displaying an item name that can be delivered for the video game, a display region for displaying whether the item is to be delivered with charge or charge-free, and an obtaining selectable region for selecting whether the item is to be obtained. In this case, the state where the item I utilized for the online video game G is selected to obtain is shown in FIG. 6.

Subsequently, the player terminal 31 receives a desired item that the player P desires to obtain (Step S107). The player P operates an input device, with which the player terminal 31 is provided, to search item to be obtained while browsing the item list screen, thereby carrying out the selection of the desired item. Here, the item I utilized for the online video game G is selected as shown in FIG. 6.

When the desired item I is received on the basis of an operation of the player P, the player terminal 31 transmits the item ID indicating the received desired item I (in this case, the item identification information including the item name) to the marketplace providing server 22 (Step S108).

When the desired game item receiving section 22b of the marketplace providing server 22 receives the item identification information indicating the desired item I from the player terminal 31 via the communication network 40 (Step S109), the tag data applying section 22c of the marketplace providing server 22 creates tag data for uniquely specifying the desired item I, and adds the tag data to the received item identification information (Step S110).

The tag data created at Step S110 are constituted from the tag ID and the marketplace ID applied to the marketplace that the marketplace providing server 22 manages. The tag ID is an ID sequentially and newly issued whenever the item is downloaded. Thus, even in the case of downloading the same item, a unique identification number is applied to each of all the items depending on when and who downloads the item (for example, in the case where the same item is downloaded multiple times at the same time, a separate ID is applied to each of the items).

The marketplace providing server 22 then transmits the item identification information to which the tag data are added to the player terminal 31 (Step S111).

When the item identification information to which the tag data is added is received, the player terminal 31 creates header data, and adds the created header data to the item identification information to which the tag data are added (Step S112). The player terminal 31 then stores the item identification information to which the header data and the tag data are added in the memory, with which the player terminal 31 is provided, as the obtained item information (item usage data) capable of specifying the obtained item (Step S113). In this regard, the creation and addition of the header data may be executed in the marketplace providing server 22, and the obtained item information may be transmitted to the player terminal 31.

In the present embodiment, by delivering the item identification information to which the tag data is added to cause the player terminal 31 to store the obtained item information, the item is to be delivered to the player terminal 31. Thus, the processes up to Step S113 allow the item to be delivered to the player P (player terminal 31). Although the main portion of the item such as the item body data is not included in the tag data or the item identification information, they are set to a state where they can be utilized by means of the following processes.

In response to an operation of the player P, the player terminal 31 transmits the obtained item information stored in the memory with which the player terminal 31 is provided to the online video game control server 11 (Step S114).

When the obtained item information is received, the online video game control server 11 refers to an item data table stored in the DB with which the online video game control server 11 is provided to associate the item data including the item ID included in the received obtained item information with the received obtained item information. The online video game control server 11 also creates item setup data to which an item capable of specifying whether or not the received obtained item information remains within usage restrictions (for example, a usable term, a usable count and the like) is added (Step S115). The online video game control server 11 then registers the created item setup data in an item setup data table stored in the DB with which the online video game control server 11 is provided (Step S116).

The processes at Steps S114 to S116 described above allow the obtained item I to be set to a usable state.

Then, in accordance with an operation of the player P or when timing of utilizing the obtained item in the video game is made, the player terminal 31 requests to utilize the setup item I by presenting the obtained item information stored in the memory with which the player terminal 31 is provided (Step S117).

When the request to utilize the setup item I is received, the online video game control server 11 refers to the item setup data table, and updates the item setup data of the item I as needed (Step S118). Namely, in the case where a variable item such as a usable term or a usable count is included in the item setup data, the online video game control server 11 updates the contents of the variable item as needed. More specifically, when 20 days that is a usable term elapses from the download, the determination item for usage restrictions indicating whether to remain within the expiration date or not is updated from a mark "circle" to a mark "cross". Further, for example, the usage count for determining whether to remain within the usable count or not is incremented. In the case where the usage count after addition exceeds the usable count, the determination item for usage restrictions indicating whether to remain within the usable count or not is updated from a mark "circle" to a mark "cross". After executing the process at Step S118, the item I is utilized in the online video game G.

As explained above, in the embodiment described above, the game contents delivery system 100 of the present invention is constructed so as to include the online video game control servers 11 to 1N that controls progress of the video game played in each of the player terminals 31 to 3N respectively operated by the players via the communication network 40 and the marketplace providing server 22 that delivers the item utilized in the video game to the player terminals 31 to 3N via the communication network 40. In this case, the marketplace providing server 22 has the item identification information DB 22f for storing the item identification information including the item ID; receives a desire to obtain an item from the player terminal 31 with presentation of the item ID; creates tag data uniquely defined including the tag ID when the desire to obtain the item to add the created tag data to the item identification information; and delivers the item to the player terminal 31 by transmitting the item identification information with the tag data to the player terminal 31. The online video game control server 11 has a database for storing item data including the item identification information and the item body data; creates item data for registration including the obtained item information and the item body data of the item data including the item ID included in the obtained item information in the case where the obtained item information in which header data are added to the obtained tag data is received from the player character 31; and registers the created item data for registration so that the item indicated by the obtained item information can be utilized. Thus, it is possible to reduce the processing load to deliver items utilized in a video game and to increase entities that deliver items, and this makes it possible to improve convenience to deliver and obtain the items.

Namely, a game platformer that directly provides the item to the player holds only the item identification information. When the item is delivered to the player, only the tag data are applied to the item. When the player terminal represents the tag data to the game contents provider, the player terminal becomes a state where the item capable of being specified by the tag data can be utilized. Thus, when a third party other than the game platformer (in the present embodiment, game contents provider and the like) manufactures and delivers (or sells) a new item usable in the video game to the game platformer, management of the item data between the game platformer and the item creator and deliverer can be carried out effectively. This makes it possible to improve convenience of delivering and obtaining of the new item.

Further, since the game platformer that directly delivers the item to the player may hold only the item identification information, it is possible to reduce the processing load to deliver the item significantly. In addition, management of the game platformer relating to delivery of the item is improved. In the case where application of the tag data (a rule to issue the tag) is provided, it is possible to readily increase entities for delivering an item in the video game. Namely, since there is no need that the delivery entities are limited to the game platformer, items can be sold even in a virtual shop and the like on a network such as the Internet, which deal with goods (articles for sale) other than the game contents (for example, contents other than the game contents such as books, daily goods and animations). Thus, the item creator has a merit to be capable of increasing opportunities of delivering an item. Therefore, in the case where the item is delivered with charge, it can be expected that profits of the game contents provider are increased because of increase in opportunities of selling.

Further, in the embodiment described above, the game contents provider creates the item data table in a game server (for example, the online video game control server 11) of a game title provided by the game contents provider, and unifies the management of information relating to all of the items including the item body data that is not delivered to the game platformer. Thus, the management of the items can be facilitated. Since the item body data is absolutely managed by only the game contents provider in this manner, it is possible to change the contents of the item arbitrarily by means of operations of the game contents provider to the item data table in the game server even in the case of data relating to the item that the player has downloaded.

Moreover, in the embodiment described above, there is no need to download the item data in the player terminal 31. In this case, the tag data may be obtained from the game platformer, and the obtained item information in which header data are applied to the obtained tag data may be represented to the online video game control server 11. Thus, the player is allowed to utilize the item having a complicated property with a simple exchange between the player terminal 31 and the game platformer. In this regard, in the case where the header data are added to the game platformer, processing in the player terminal 31 can be simplified further.

Furthermore, in the embodiment described above, the tag data are to be data uniquely defined. Thus, even in the case where the same kind of item is delivered multiple times, the player is allowed to issue a complicated instruction (for example, an instruction to separately utilize the items)

because the tag data are different from each other. This makes it possible to improve taste of the player. In this case, random numerical value ensured to be unique without overlapping in the world (such as a globally unique identifier (GUID), a universally unique identifier (UUID) and the like) may be utilized as the tag data.

Further, in the embodiment described above, date and time when to obtain the item is included in the header data, and variable items such as usable term after obtaining the item are included in the item body data. When the request to utilize the item in the video game is received, the online video game control server 11 updates the variable items in the registered item data as needed. Thus, it is possible to deliver an item in which a variable item is included in item data, and this makes it possible to increase variation of the item. In this regard, with respect to the variable items, the usable term as described above is an example, and the variable items may include a usable count and the like, for example.

Moreover, although it has not been referred to in the embodiment described above, when the player who accesses the game platform 20 obtains a charged item (more specifically, the tag data), the player undergoes the authentication process by a marketplace operator on the basis of a settlement rule of the game platform 20, and the item is then downloaded to the player terminal 31. Since the game contents delivery system 100 is constructed in this manner, the item deliverer (or provider) can cause the marketplace side (more specifically, the authentication server 21) to execute an authentication process without uniquely executing a complicated authentication process. Thus, this makes it possible to reduce the processing load of the item deliverer oneself (that is, online video game control servers).

Furthermore, although it has not been referred to in the embodiment described above, the items may be one usable in the video game. For example, the items may include a character (such as a person, an animal and a vehicle utilized in the video game), a weapon, a protector, a fitting object (such as an armor that the character wears and the like) and a medicine utilized in the video game (such as a recovery medicine and a poison).

Further, although it has not been referred to in the embodiment described above, the destination to save (or store) the obtained item information may be detachable and mobile recording medium such as a memory stick. In this case, the data (that is, the obtained item information) can be carried with the recording medium. By carrying the data with the recording medium or forwarding the obtained item data as an e-mail attachment, the player is allowed to utilize the data downloaded by accessing the marketplace from a mobile terminal such as a mobile communication terminal at a game title played using other terminal such as a personal computer. This makes it possible to further reduce time restriction when the player obtains the item and location restriction.

Moreover, although the item has been mentioned as an example of the game contents in the embodiment described above, the present invention can be applied to other contents complementarily usable in the video game video game.

In this regard, although the delivery of the items utilized in the online RPG, in particular, has been explained in the embodiment described above, there is no wonder that the technique of the present invention can be applied to a delivery of other online video game such as an online car racing game. In addition, the technique of the present invention can also be applied to other kinds of video games appropriately, as will be readily apparent to those skilled in the art, without departing from the scope of spirit of the present invention.

The present invention can be applied to a game contents delivery system and the like that can reduce the processing load to deliver items utilized in a video game and increase entities that deliver items, and this makes it possible to improve convenience to deliver and obtain the items. Therefore, the present invention is useful.

What is claimed is:

1. A game contents delivery system comprising:
   an online video game control server that controls a progress of a video game via a communication network, the video game being played in a player terminal, the player terminal being operated by a player; and
   a game contents delivery server that delivers contents utilized in the video game to the player terminal via the communication network,
   wherein the game contents delivery server comprises:
      a contents identification information database that stores contents identification information including a contents ID;
      a contents obtaining request receiver that receives a request from the player terminal to obtain the contents, the request including the contents ID;
      a tag data creator that creates tag data when the contents obtaining request receiver receives the request to obtain the contents from the player terminal, the tag data being uniquely defined; and
      a contents deliverer that delivers the contents to the player terminal by adding the tag data created by the tag data creator to the contents identification information and transmitting the contents to the player terminal,
   wherein the online video game control server comprises:
      a contents data database that stores contents data, the contents data including the contents identification information and contents body data, the contents body data specifying details of the contents; and
      a delivered contents data register that creates delivered contents data when obtained contents information, which is created by the player terminal when the player terminal receives delivery of the contents, is received from the player terminal based on header data being added to the tag data, the delivered contents data including the contents body data of the contents data including the contents ID included in the obtained contents information and the obtained contents information, the header data including a player ID for specifying one of the player and the player terminal obtaining the contents delivered by the contents deliverer and a date and time the contents is obtained, the delivered contents data register registering the created delivered contents data as utilizable contents information that can be utilized at the player terminal so that the contents indicated by the obtained contents information is rendered in a utilizable state in the video game.

2. The game contents delivery system according to claim 1, wherein the contents body data includes variable items including at least one of a usable term after obtaining the contents and a usable count for the contents, and
   wherein the game contents delivery system further comprises:
      a delivered contents data updater that updates the variable terms in the registered delivered contents data as needed when a request to utilize the contents in the video game is received.

3. The game contents delivery system according to claim 1, wherein the contents include at least one item of a character, a weapon, a protector, a fitting object and a medicine.

4. A game contents delivery method for delivering contents to a player terminal via a communication network, the contents being utilized in a video game played in a player terminal, the player terminal operated by a player, the game contents delivery method comprising:

receiving a request from the player terminal to obtain contents, the request including a contents ID;

creating tag data when the request to obtain the contents is received from the player terminal, the tag data being uniquely defined;

delivering the contents to the player terminal by adding the tag data created in the creating tag data to contents identification information and transmitting the contents to the player terminal;

creating delivered contents data by referring to a contents data database for storing contents data when obtained contents information, which is created by the player terminal when the player terminal receives delivery of the contents, is received from the player terminal based on header data being added to the tag data, the delivered contents data including contents body data of the contents data including the contents ID included in the obtained contents information and the obtained content information, the contents data including the contents identification information and the contents body data, the contents body data specifying details of the contents, the header data including a player ID for specifying one of the player and the player terminal obtaining the contents delivered by the contents deliverer and a date and time the contents is obtained; and registering the created delivered contents data in an online video game control server as utilizable contents information that can be utilized at the player terminal, so that the contents indicated by the obtained contents information is rendered in a utilizable state in the video game, the online video game control server controlling progress of the video game via the communication network.

5. The game contents delivery system according to claim 1, wherein the player terminal, upon receiving delivery of the contents from the contents deliverer, creates the header data, and stores the obtained contents information that is the contents identification information, to which the tag data and the created header data are added, the tag data being received when receiving delivery of the contents from the contents deliverer.

6. The game contents delivery system according to claim 2, wherein the contents include at least one item of a character, a weapon, a protector, a fitting object and a medicine.

* * * * *